(12) United States Patent
Kato et al.

(10) Patent No.: US 11,333,388 B2
(45) Date of Patent: May 17, 2022

(54) CONTROLLER OF AIR CONDITIONING SYSTEM, OUTDOOR UNIT, RELAY UNIT, HEAT SOURCE APPARATUS, AND AIR CONDITIONING SYSTEM

(71) Applicant: Mitsubishi Electric Corporation, Tokyo (JP)

(72) Inventors: Naoki Kato, Tokyo (JP); Yuji Motomura, Tokyo (JP); Naofumi Takenaka, Tokyo (JP); Kimitaka Kadowaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/976,310

(22) PCT Filed: Apr. 4, 2018

(86) PCT No.: PCT/JP2018/014426
§ 371 (c)(1),
(2) Date: Aug. 27, 2020

(87) PCT Pub. No.: WO2019/193685
PCT Pub. Date: Oct. 10, 2019

(65) Prior Publication Data
US 2021/0041128 A1 Feb. 11, 2021

(51) Int. Cl.
*F24F 11/84* (2018.01)
*F24F 11/86* (2018.01)
(Continued)

(52) U.S. Cl.
CPC .............. *F24F 11/84* (2018.01); *F24F 11/86* (2018.01); *F24F 2110/10* (2018.01); *F24F 2140/20* (2018.01)

(58) Field of Classification Search
CPC ........ F24F 11/84; F24F 11/86; F24F 2110/10; F24F 2140/20
See application file for complete search history.

(56) References Cited

U.S. PATENT DOCUMENTS

| | | | |
|---|---|---|---|
| 2011/0113802 A1 | 5/2011 | Wakamoto et al. | |
| 2011/0185756 A1* | 8/2011 | Yamashita | .............. F25D 21/12 62/171 |
| 2012/0174611 A1* | 7/2012 | Yamashita | .............. F24F 3/065 62/204 |

FOREIGN PATENT DOCUMENTS

| | | |
|---|---|---|
| JP | 2007-205604 A | 8/2007 |
| JP | 2007-205605 A | 8/2007 |

(Continued)

OTHER PUBLICATIONS

International Search Report of the International Searching Authority dated Jun. 19, 2018 for the corresponding International application No. PCT/JP2018/014426 (and English translation).

*Primary Examiner* — Elizabeth J Martin
*Assistant Examiner* — Nael N Babaa
(74) *Attorney, Agent, or Firm* — Posz Law Group, PLC

(57) ABSTRACT

When a state in which a driving voltage of a pump is set to an upper limit voltage and an opening degree of at least one of a plurality of flow rate control valves is set to a maximum opening degree continues for a first determination time period, an operation frequency of a compressor is raised at a first time so as to increase an amount of heat exchange by a second heat exchanger. When an operation stop request is input, or an indoor temperature reaches a set temperature, in at least one of a plurality of third heat exchangers after the first time, the operation frequency of the compressor is lowered or the driving voltage of the pump is lowered.

8 Claims, 4 Drawing Sheets

(51) Int. Cl.
   *F24F 110/10* (2018.01)
   *F24F 140/20* (2018.01)

(56) References Cited

FOREIGN PATENT DOCUMENTS

| | | |
|---|---|---|
| JP | 5188572 B2 | 4/2013 |
| JP | 2013-190162 A | 9/2013 |
| JP | 2013-194975 A | 9/2013 |
| WO | 2010/050002 A1 | 5/2010 |

\* cited by examiner

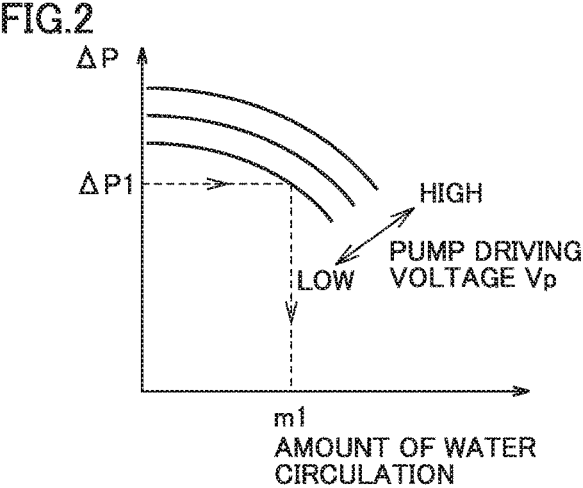
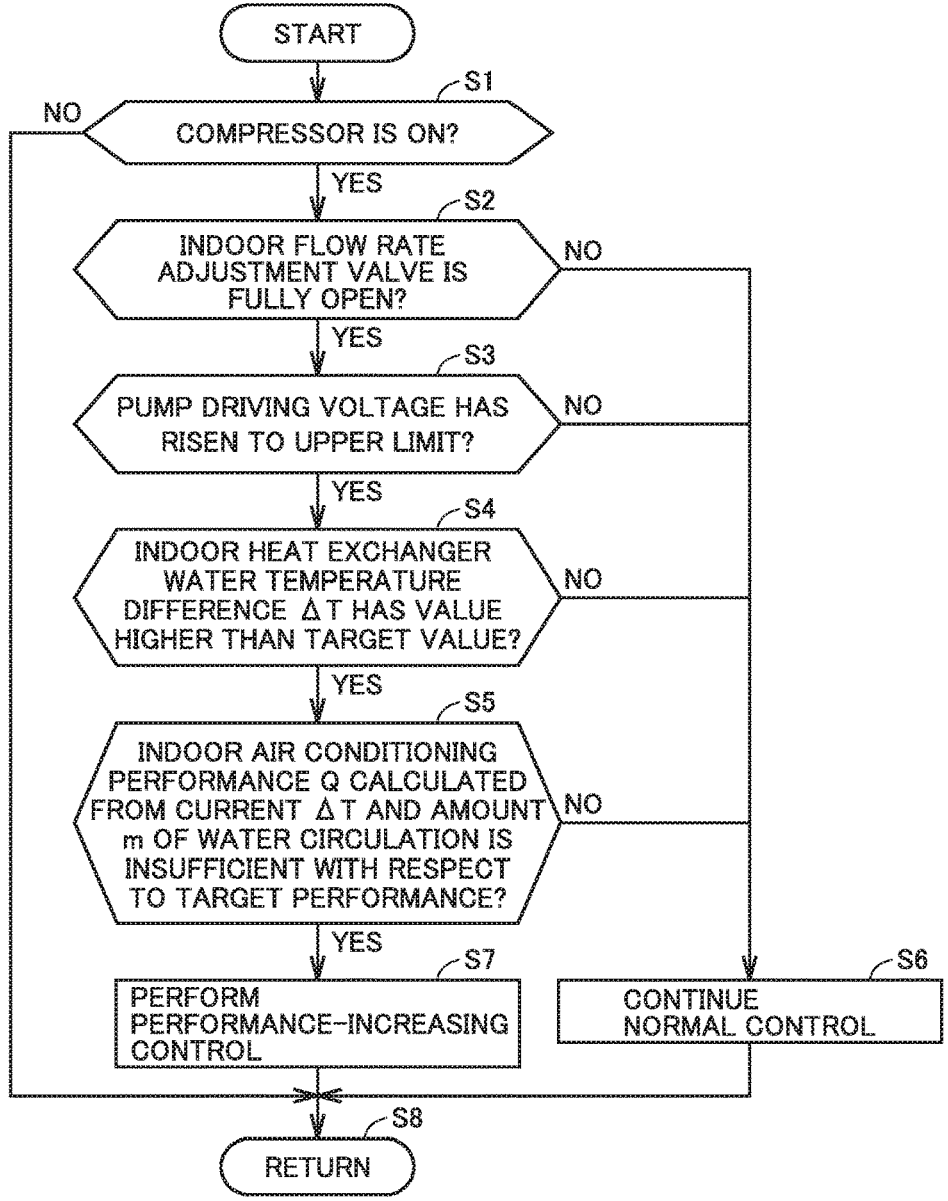

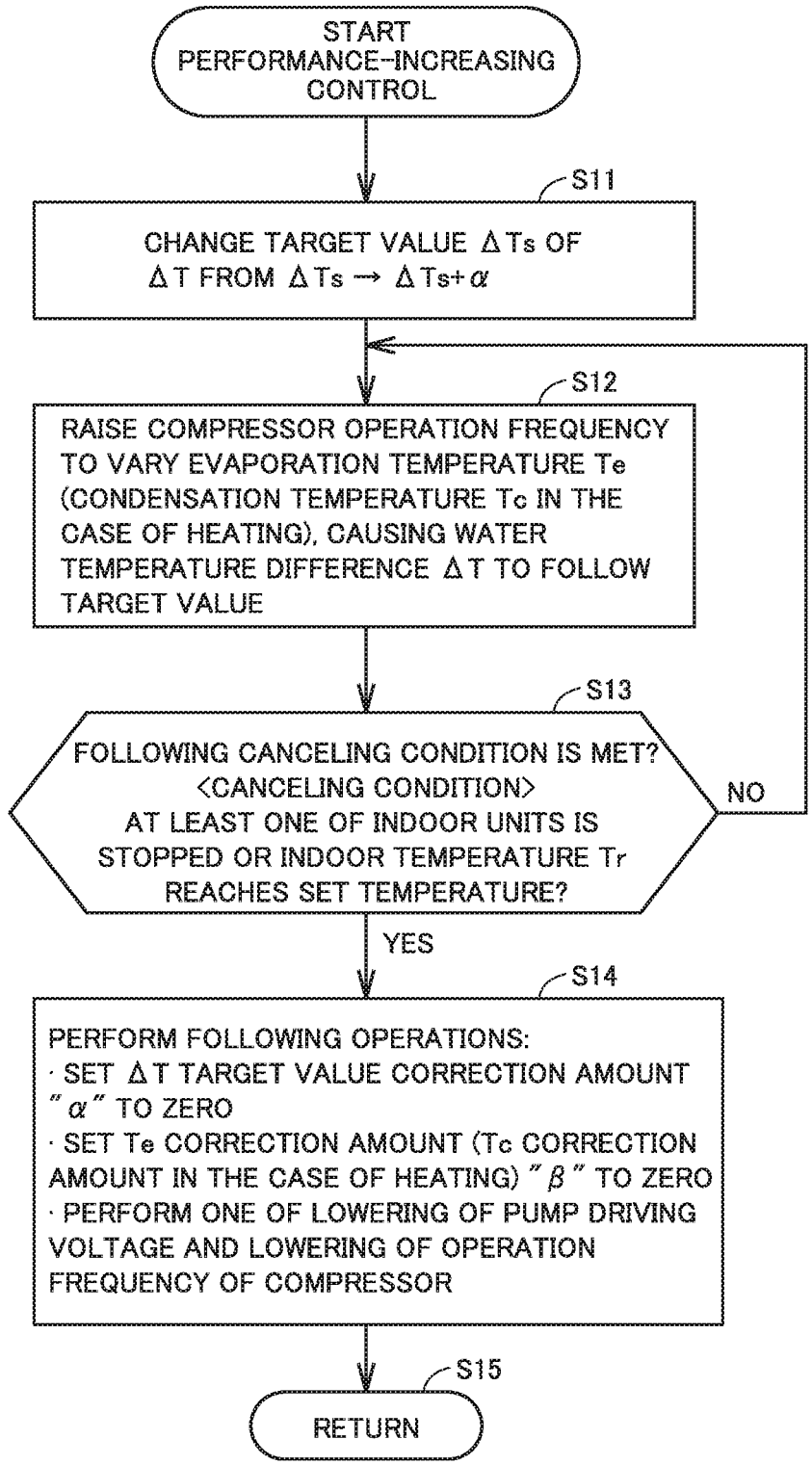

CONTROLLER OF AIR CONDITIONING SYSTEM, OUTDOOR UNIT, RELAY UNIT, HEAT SOURCE APPARATUS, AND AIR CONDITIONING SYSTEM

CROSS REFERENCE TO RELATED APPLICATION

This application is a U.S. national stage application of International Application No. PCT/JP2018/014426 filed on Apr. 4, 2018, the contents of which are incorporated herein by reference.

TECHNICAL FIELD

The present invention relates to a controller of an air conditioning system, an outdoor unit, a relay unit, a heat source apparatus, and an air conditioning system, and more specifically to a controller of an air conditioning system using a first heat medium and a second heat medium, an outdoor unit, a relay unit, a heat source apparatus, and an air conditioning system.

BACKGROUND ART

Conventionally, an indirect air conditioning apparatus is known that generates hot and/or chilled water by a heat source apparatus such as a heat pump, and delivers the water to an indoor unit through a water pump and a pipe to perform heating and/or cooling in the interior of a room.

Japanese Patent No. 5188572 discloses an air conditioning apparatus that causes a heat source-side heat medium circulating through a heat source-side circuit and a use-side heat medium circulating through a use-side circuit to exchange heat at a plurality of intermediate heat exchangers provided at a relay portion. Such an indirect air conditioning apparatus employs water or brine as a use-side heat medium, and thus has been receiving increasing attention in recent years in order to reduce refrigerant usage.

CITATION LIST

Patent Literature

PTL 1: Japanese Patent No. 5188572

SUMMARY OF INVENTION

Technical Problem

In an indirect air conditioning apparatus such as described above, the length of, and the number of bent portions of, a water pipe between an indoor unit and a relay unit vary with the arrangement of the indoor unit and the relay unit, resulting in various resistances to water flow in the pipe as well. It is thus difficult to determine the capacity of a water pump. While it is preferred to install a water pump having a sufficient capacity, it is conceivable that a water pump having a smaller capacity than is required may be installed. An insufficient capacity of the water pump may result in insufficient heating and/or cooling performance.

The present invention has been made to solve the problem described above, and has an object to provide a controller of an air conditioning system capable of keeping heating and/or cooling performance within an appropriate range, an outdoor unit, a relay unit, a heat source apparatus, and an air conditioning system, in an indirect air conditioner using water or brine.

Solution to Problem

The present disclosure relates to a controller of an air conditioning system. The air conditioning system includes: a compressor configured to compress a first heat medium; a first heat exchanger configured to exchange heat between the first heat medium and outdoor air; a second heat exchanger configured to exchange heat between the first heat medium and a second heat medium; a plurality of third heat exchangers configured to exchange heat between the second heat medium and indoor air; a plurality of flow rate control valves configured to control flow rates of the second heat medium flowing respectively in the plurality of third heat exchangers; and a pump configured to circulate the second heat medium between the plurality of third heat exchangers and the second heat exchanger. When a state in which a driving voltage of the pump is set to an upper limit voltage and an opening degree of at least one of the plurality of flow rate control valves is set to a maximum opening degree continues for a first determination time period, the controller that controls the air conditioning system is configured to raise an operation frequency of the compressor at a first time so as to increase an amount of heat exchange by the second heat exchanger. When an operation stop request is input, or an indoor temperature reaches a set temperature, in at least one of the plurality of third heat exchangers after the first time, the controller is configured to lower the operation frequency of the compressor or lower the driving voltage of the pump.

In another aspect, the present disclosure relates to an outdoor unit, including the compressor, the first heat exchanger, and the controller.

In yet another aspect, the present disclosure relates to a relay unit, including the second heat exchanger, the pump, and the controller.

In yet another aspect, the present disclosure relates to a heat source apparatus, including the compressor, the first heat exchanger, the second heat exchanger, the pump, and the controller.

In yet another aspect, the present disclosure relates to an air conditioning system, including: a first heat medium circuit formed by the compressor, the first heat exchanger and the second heat exchanger; a second heat medium circuit formed by the pump, the second heat exchanger and the plurality of third heat exchangers; and the controller.

Advantageous Effects of Invention

According to the air conditioning apparatus, the heat source apparatus and the controller of the present disclosure, performance of a heat source or a cold source is increased or decreased as needed when a pump has an insufficient capacity, so that the heating and/or cooling performance can be kept within an appropriate range.

BRIEF DESCRIPTION OF DRAWINGS

FIG. 2 shows relation between an amount of water circulation and a differential pressure.

FIG. 3 is a flowchart to illustrate a determination process performed by a controller 100.

FIG. 5 is a flowchart to illustrate the process of increasing air conditioning performance performed by controller 100.

DESCRIPTION OF EMBODIMENTS

Figure 1:
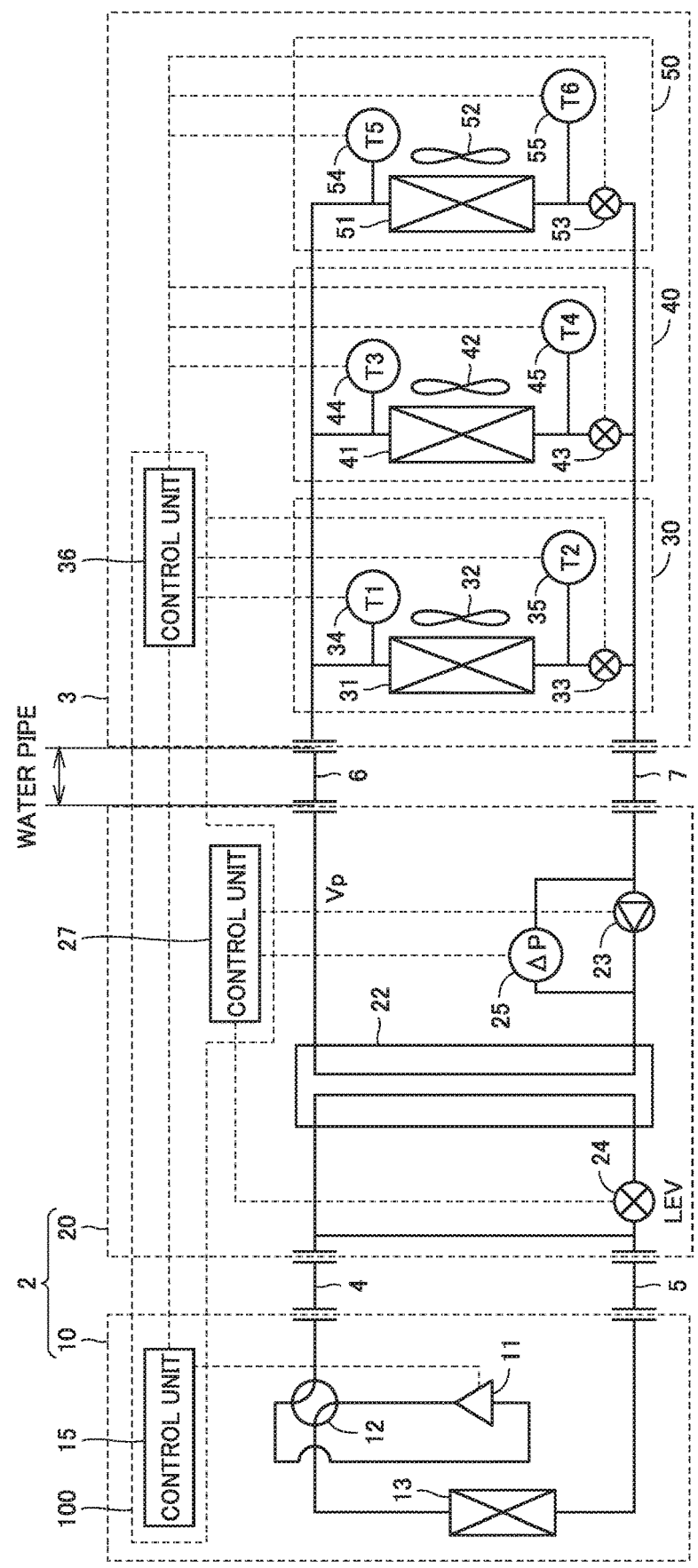
FIG. 1 shows the configuration of an air conditioning apparatus according to a first embodiment.

In the following, embodiments of the present invention will be described in detail with reference to the drawings. While a plurality of embodiments are described below, it has been intended from the time of filing of the present application to appropriately combine configurations described in the respective embodiments. Note that the same or corresponding parts are designated by the same characters in the drawings and will not be described repeatedly.

First Embodiment

FIG. 1 shows the configuration of an air conditioning apparatus according to a first embodiment. Referring to FIG. 1, an air conditioning apparatus 1 includes a heat source apparatus 2, an indoor air conditioning device 3, and a controller 100. Heat source apparatus 2 includes an outdoor unit 10 and a relay unit 20. In the following description, a first heat medium can be exemplified by refrigerant, and a second heat medium can be exemplified by water or brine.

Outdoor unit 10 includes part of a refrigeration cycle that operates as a heat source or a cold source for the first heat medium. Outdoor unit 10 includes a compressor 11, a four-way valve 12, and a first heat exchanger 13. FIG. 1 shows an example where four-way valve 12 performs cooling, with heat source apparatus 2 serving as a cold source. When four-way valve 12 is switched to reverse the direction of circulation of the refrigerant, heating is performed, with heat source apparatus 2 serving as a heat source.

Relay unit 20 includes a second heat exchanger 22, a pump 23 for circulating the second heat medium between indoor air conditioning device 3 and the outdoor unit, an expansion valve 24, and a pressure sensor 25 for detecting a differential pressure ΔP before and after pump 23. Second heat exchanger 22 exchanges heat between the first heat medium and the second heat medium. A plate heat exchanger can be used as second heat exchanger 22.

Outdoor unit 10 and relay unit 20 are connected to each other by pipes 4 and 5 for flowing the first heat medium. Compressor 11, four-way valve 12, first heat exchanger 13, expansion valve 24, and second heat exchanger 22 form a first heat medium circuit using the first heat medium. Note that outdoor unit 10 and relay unit 20 may be integrated together in heat source apparatus 2. If they are integrated together, pipes 4 and 5 are accommodated in a casing.

Indoor air conditioning device 3 and relay unit 20 are connected to each other by pipes 6 and 7 for flowing the second heat medium. Indoor air conditioning device 3 includes an indoor unit 30, an indoor unit 40 and an indoor unit 50. Indoor units 30, 40 and 50 are connected in parallel with one another between pipe 6 and pipe 7. Pump 23, second heat exchanger 22, and parallel-connected third heat exchanger 31, third heat exchanger 41 and third heat exchanger 51 which will be described later form a second heat medium circuit using the second heat medium.

Indoor unit 30 includes third heat exchanger 31, an indoor fan 32 for delivering indoor air to third heat exchanger 31, a flow rate control valve 33 for controlling a flow rate of the second heat medium, and temperature sensors 34, 35. Third heat exchanger 31 exchanges heat between the second heat medium and the indoor air. Temperature sensor 34 measures a temperature of the second heat medium at an inlet side of third heat exchanger 31. Temperature sensor 35 measures a temperature of the second heat medium at an outlet side of third heat exchanger 31.

Indoor unit 40 includes third heat exchanger 41, an indoor fan 42 for delivering indoor air to third heat exchanger 41, a flow rate control valve 43 for controlling a flow rate of the second heat medium, and temperature sensors 44, 45. Third heat exchanger 41 exchanges heat between the second heat medium and the indoor air. Temperature sensor 44 measures a temperature of the second heat medium at an inlet side of third heat exchanger 41. Temperature sensor 45 measures a temperature of the second heat medium at an outlet side of third heat exchanger 41.

Indoor unit 50 includes third heat exchanger 51, an indoor fan 52 for delivering indoor air to third heat exchanger 51, a flow rate control valve 53 for controlling a flow rate of the second heat medium, and temperature sensors 54, 55. Third heat exchanger 51 exchanges heat between the second heat medium and the indoor air. Temperature sensor 54 measures a temperature of the second heat medium at an inlet side of third heat exchanger 51. Temperature sensor 55 measures a temperature of the second heat medium at an outlet side of third heat exchanger 51.

Control units 15, 27 and 36 distributed among outdoor unit 10, relay unit 20 and indoor air conditioning device 3 cooperate with one another to operate as controller 100. Controller 100 controls compressor 11, expansion valve 24, pump 23, flow rate control valves 33, 43, 53, and indoor fans 32, 42, 52 in response to outputs from pressure sensor 25 and temperature sensors 34, 35, 44, 45, 54, 55.

Note that one of control units 15, 27 and 36 may serve as a controller, and control compressor 11, expansion valve 24, pump 23, flow rate control valves 33, 43, 53, and indoor fans 32, 42, 52 based on data detected by the other control units 15, 27 and 36. Note that if heat source apparatus 2 has outdoor unit 10 and relay unit 20 that are integrated together, control units 15 and 27 may cooperate with each other to operate as a controller based on data detected by control unit 36.

In such indirect (water air conditioning) air conditioning apparatus 1 using two types of heat media, performance of pump 23 needs to be appropriately selected in accordance with the number of indoor units, and the length and path of pipes 6 and 7. It is difficult, however, to correctly identify the length of, and the bent portions of, a pipe to be connected, and to identify pump performance. Accordingly, a pump lower in performance than is appropriate may be installed at the time of construction, resulting in insufficient air conditioning performance at a site of installation.

For this reason, when an amount of water delivered by pump 23 is at a maximum value and indoor air conditioning performance is not satisfying required performance, controller 100 varies the temperature of the second heat medium (water or brine) at the heat source apparatus 2 side, to thereby avoid the insufficient performance at the site of installation.

Specifically, when at least one of flow rate control valves 33, 43 and 53 is fully open and a driving voltage of pump 23 is at its maximum, if an inlet/outlet water temperature difference ΔT in the indoor heat exchanger corresponding to the fully open flow rate control valve maintains a value higher than a target value (=a state in which the performance cannot be ensured even with the pump at its maximum), controller 100 lowers an evaporation temperature Te at the heat source apparatus side (raises a condensation temperature Tc in the case of heating) to increase temperature difference ΔT, to thereby enhance the reduced indoor air conditioning performance Note that ΔT=|T1−T2|, or |T3−T4|, or |T5−T6| holds in FIG. 1, where T1 to T6 represent the temperatures of the second heat medium detected by temperature sensors 34, 35, 44, 45, 54 and 55, respectively.

Here, indoor air conditioning performance Q is expressed by: Q=m×Cp×ΔT, where m represents an amount of circulation of the second heat medium, and Cp represents a specific heat of the second heat medium.

FIG. 2 shows relation between an amount of water circulation and a differential pressure. Each curve shown in FIG. 2 represents a head characteristic of pump 23, and the head characteristic is known in advance for each driving voltage of pump 23. Controller 100 calculates amount m of water circulation based on differential pressure ΔP before and after pump 23, a pump driving voltage Vp, and the pump head characteristic shown in FIG. 2. When amount m of water circulation is lower than a proper flow rate, controller 100 increases an amount of heat exchange by second heat exchanger 22 of heat source apparatus 2 to raise ΔT, thereby ensuring indoor air conditioning performance Q.

FIG. 3 is a flowchart to illustrate a determination process performed by controller 100. The process of this flowchart is invoked from a main routine of air conditioning control and performed at regular intervals or whenever a determination condition is met. Referring to FIG. 3, first, in step S1, controller 100 determines whether or not compressor 11 is operating. When compressor 11 is not operating, in step S8, controller 100 returns the process to the main routine.

When compressor 11 is operating (ON state) in step S1, the process proceeds to step S2. In step S2, controller 100 determines whether or not at least one of flow rate control valves 33, 43 and 53 is fully open.

When one of flow rate control valves 33, 43 and 53 is fully open in step S2 (YES in S2), the process proceeds to step S3. In step S3, it is determined whether or not driving voltage Vp of pump 23 has risen to an upper limit voltage Vu.

When driving voltage Vp of pump 23 has risen to upper limit voltage Vu in step S3, the process proceeds to step S4. In step S4, controller 100 determines whether or not temperature difference ΔT in one of indoor heat exchangers 31, 41 and 51 that corresponds to the fully open one of flow rate control valves 33, 43 and 53 has a value higher than a target value.

When temperature difference ΔT has a value higher than the target value in step S4, the process proceeds to step S5. In step S5, it is determined whether or not indoor air conditioning performance Q calculated from current temperature difference ΔT and amount m of water circulation is insufficient with respect to target performance Qx.

When indoor air conditioning performance Q is insufficient with respect to target performance Qx in step S5, control to increase the air conditioning performance is performed in step S7. The details of this control will be described with reference to FIGS. 4 and 5.

When any one of the conditions in steps S2 to S5 is not met (NO in any one of S2 to S5), on the other hand, the process proceeds to step S6, where normal control is performed. In the normal control, an operation frequency of compressor 11 is adjusted such that evaporation temperature Te reaches a target temperature in the case of cooling, and the operation frequency of compressor 11 is adjusted such that condensation temperature Tc reaches a target temperature in the case of heating.

Figure 4:
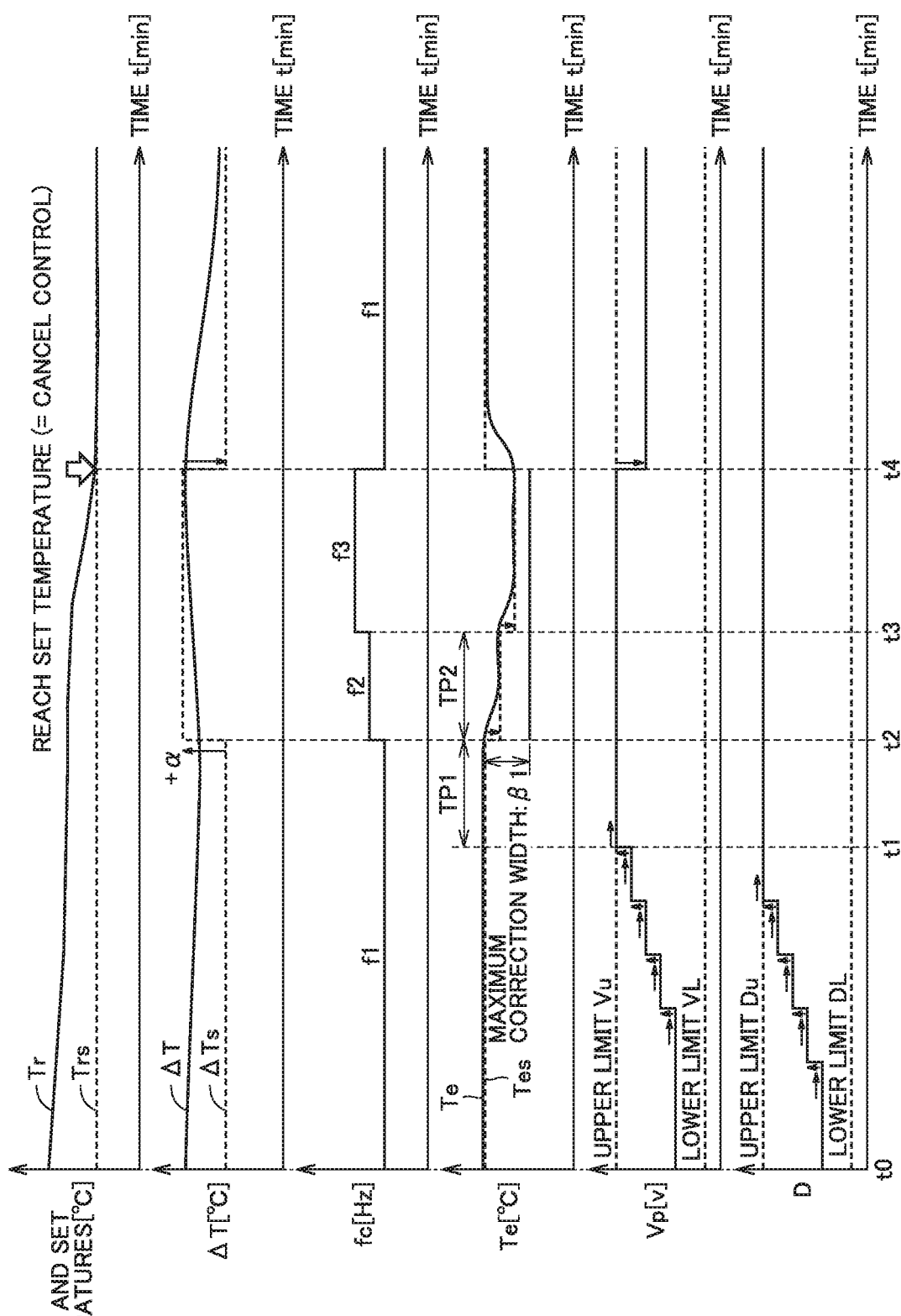
FIG. 4 is an operation waveform diagram showing one example where a process of increasing air conditioning performance is performed.

FIG. 4 is an operation waveform diagram showing one example where a process of increasing air conditioning performance is performed. FIG. 4 shows, from the top to the bottom: indoor temperature Tr [° C.] and set temperature Trs [° C.]; inlet/outlet temperature difference ΔT [° C.] and temperature difference target value ΔTs [° C.] of the indoor unit; operation frequency fc [Hz] of the compressor; evaporation temperature Te [° C.] and evaporation temperature target value Tes [° C.] of the first heat medium; pump driving voltage Vp [V]; and flow rate control valve opening degree D.

This waveform diagram shows an example where cooling operation is being performed. Between times t0 and t1, normal control is performed, with operation frequency fc of compressor 11 being set to a frequency f1. Expansion valve 24 is controlled such that evaporation temperature Te in first heat exchanger 13 matches target value Tes. Since indoor temperature Tr is higher than set temperature Trs, the cooling performance of the indoor unit is increased. In this case, an actual measured value ΔT calculated from the temperatures measured by temperature sensors 34 and 35 is higher than target value ΔTs of temperature difference ΔT.

When at least one of the plurality of third heat exchangers is insufficient in air conditioning performance (Tr>Trs) in this manner, if opening degree D of the flow rate control valve corresponding to the third heat exchanger insufficient in air conditioning performance is smaller than a maximum opening degree Du, or if driving voltage Vp of the pump is lower than upper limit voltage Vu, controller 100 performs control to raise driving voltage Vp of the pump or to increase opening degree D of the corresponding flow rate control valve, so as to increase the flow rate of the second heat medium flowing in the third heat exchanger insufficient in air conditioning performance. Accordingly, between times t0 and t1, opening degree D of flow rate control valve 33 and the driving voltage of pump 23 are increased in a stepwise manner, to enhance the cooling performance of the indoor unit.

At time t1, opening degree D of flow rate control valve 33 reaches maximum opening degree Du, and driving voltage Vp of pump 23 reaches upper limit voltage Vu, and thus the flow rate of the second heat medium to the indoor unit can no longer be increased.

Between times t1 and t2, a state continues in which indoor temperature Tr does not decrease to set temperature Trs, although opening degree D is maximum opening degree Du and driving voltage Vp of pump 23 is upper limit voltage Vu.

At time t2, in response to a lapse of a first determination time period TP1 in such a state, controller 100 starts performance-increasing control.

FIG. 5 is a flowchart to illustrate the process of increasing air conditioning performance performed by controller 100. Referring to FIGS. 4 and 5, when the performance-increasing control is started at time t2, controller 100 changes the target value of temperature difference ΔT from ΔTs to ΔTs+α (step S11). An amount of correction for target value ΔTs in this case is +α. As a result, the actual measured value of temperature difference ΔT becomes lower than target value ΔTs+α. In response, controller 100 raises operation frequency fc of compressor 11 from f1 to f2 to thereby vary evaporation temperature Te, causing temperature difference ΔT to follow target value ΔTs+α.

At time t3 when a second determination time period TP2 elapses in this state, temperature difference ΔT has not yet been able to follow target value ΔTs+α. Therefore, controller 100 further raises operation frequency fc of compressor 11 from f2 to f3 to thereby further vary evaporation temperature Te, causing temperature difference ΔT to follow target value ΔTs+α (step S12).

Note that a maximum value of an amount of correction for evaporation temperature Te in this case is set to β1 (in the case of cooling). Maximum value β1 is set such that evaporation temperature Te after the correction does not fall below the freezing temperature 0° C. of water. In the case of heating, a maximum value of an amount of correction for condensation temperature Tc is set to β2.

In this manner, operation frequency fc of compressor 11 is raised in a stepwise manner if temperature difference ΔT has not reached target value ΔTs+α after a lapse of a certain period of time. This is repeated until a canceling condition (step S13) is met. The canceling condition is met when at least one of the indoor units is stopped with a remote controller or the like, or when indoor temperature Tr reaches set temperature Trs (thermo-off state).

In the present embodiment, at time t4, indoor temperature Tr reaches set temperature Trs to satisfy the canceling condition (YES in S13). As a result, controller 100 sets amount of correction α for the target value of temperature difference ΔT to zero, returns the target value to ΔTs, sets amount of correction β for evaporation temperature Te to zero, returns the target value of evaporation temperature Te to Tes, and performs at least one of lowering of pump driving voltage Vp and lowering of operation frequency fc of compressor 11 (step S14). While both the process of lowering pump driving voltage Vp and the process of lowering operation frequency fc of compressor 11 are performed at time t4 in the waveform diagram of FIG. 4, either one of the processes may be performed.

Then, the process returns to the main routine in step S15, and it is determined again whether the performance-increasing control or the normal control should be performed by the process shown in the flowchart of FIG. 3.

Referring again to FIG. 1, the air conditioning apparatus in the present embodiment described above is summarized. Air conditioning apparatus 1 shown in FIG. 1 includes: compressor 11 for compressing the first heat medium (refrigerant); first heat exchanger 13 for exchanging heat between the first heat medium and outdoor air; second heat exchanger 22 for exchanging heat between the first heat medium and the second heat medium (water or brine); the plurality of third heat exchangers 31, 41 and 51 for exchanging heat between the second heat medium and indoor air; the plurality of flow rate control valves 33, 43 and 53 for controlling the flow rates of the second heat medium flowing respectively in the plurality of third heat exchangers 31, 41 and 51; and pump 23 for circulating the second heat medium between the plurality of third heat exchangers 31, 41, 51 and second heat exchanger 22.

As shown in FIG. 4, when a state in which driving voltage Vp of pump 23 is set to upper limit voltage Vu and opening degree D of at least one of the plurality of flow rate control valves 33, 43 and 53 is set to maximum opening degree Du continues for first determination time period TP1 between times t1 and t2, operation frequency fc of compressor 11 is raised from f1 to f2 at a first time (t2) so as to increase the amount of heat exchange by second heat exchanger 22. When indoor temperature Tr reaches set temperature Trs in at least one of the plurality of third heat exchangers 31, 41 and 51 at time t4 after the first time (t2), operation frequency fc of compressor 11 is lowered from f3 to f1, and driving voltage Vp of pump 23 is lowered. Note that only one of operation frequency fc and driving voltage Vp of pump 23 may be lowered at time t4. In addition, this process may be performed when an operation stop request is input, instead of when indoor temperature Tr reaches set temperature Trs.

In this manner, the performance of a heat source or a cold source is increased or decreased as needed when the pump has an insufficient capacity, so that the heating and/or cooling performance can be kept within an appropriate range.

Preferably, air conditioning apparatus 1 further includes: the plurality of first temperature sensors 34, 44 and 54 for detecting the temperatures of the second heat medium flowing respectively into the plurality of third heat exchangers 31, 41 and 51; the plurality of second temperature sensors 35, 45 and 55 for detecting the temperatures of the second heat medium flowing respectively out of the plurality of third heat exchangers 31, 41 and 51; and controller 100 for controlling pump 23 and compressor 11.

When a state in which driving voltage Vp of pump 23 is set to upper limit voltage Vu and opening degree D of at least one of the plurality of flow rate control valves 33, 43 and 53 is set to maximum opening degree Du continues for first determination time period TP1 between times t1 and t2 in FIG. 4, controller 100 raises operation frequency fc of compressor 11 by a first amount of increase Δf1 (=f2−f1) at the first time (t2) so as to increase the amount of heat exchange by second heat exchanger 22, and when difference ΔT between the temperatures detected by the first temperature sensor and the second temperature sensor is still smaller than target value ΔTs after a lapse of second determination time period TP2 since the first time (t2), controller 100 further raises operation frequency fc of compressor 11 by a second amount of increase Δf2 (=f3−f2) at time t3.

By enhancing the performance of the heat source apparatus in a stepwise manner as described above, the indoor temperature can be smoothly guided to match the set temperature, while excessive increase in performance such as increase or decrease in indoor temperature past the set temperature is prevented.

Preferably, the first heat medium is refrigerant, and the second heat medium is water. Target temperature Tes when maximum value β1 of correction width shown in the range between times t2 and t4 in FIG. 4 is applied is set to be higher than the freezing temperature of water (0° C.). That is, controller 100 controls operation frequency fc of compressor 11 to such an extent that evaporation temperature Te of the refrigerant in the second heat exchanger does not fall below the freezing temperature of water (0° C.). As a result, the performance of the heat source apparatus can be enhanced to such an extent that the second heat medium does not freeze.

It should be understood that the embodiments disclosed herein are illustrative and non-restrictive in every respect. The scope of the present invention is defined by the terms of the claims, rather than the description of the embodiments above, and is intended to include any modifications within the meaning and scope equivalent to the terms of the claims.

REFERENCE SIGNS LIST 1 air conditioning apparatus; 2 heat source apparatus; 3 indoor air conditioning device; 4, 5, 6, 7 pipe; 10 outdoor unit; 11 compressor; 12 four-way valve; 13 first heat exchanger; 15, 27, 36 control unit; 20 relay unit; 22 second heat exchanger; 23 pump; 24 expansion valve; 25 pressure sensor; 30, 40, 50 indoor unit; 31, 41, 51 third heat exchanger; 32, 42, 52 indoor fan; 33, 43, 53 flow rate control valve; 34, 35, 44, 45, 54, 55 temperature sensor; 100 controller.

The invention claimed is:

1. A controller that controls an air conditioning system, the air conditioning system comprising:
   a compressor configured to compress a first heat medium;
   a first heat exchanger configured to exchange heat between the first heat medium and outdoor air;
   a second heat exchanger configured to exchange heat between the first heat medium and a second heat medium;
   a plurality of third heat exchangers configured to exchange heat between the second heat medium and indoor air;
   a plurality of flow rate control valves configured to control flow rates of the second heat medium flowing respectively in the plurality of third heat exchangers;
   a pump configured to circulate the second heat medium between the plurality of third heat exchangers and the second heat exchanger;
   a plurality of first temperature sensors configured to detect temperatures of the second heat medium flowing respectively into the plurality of third heat exchangers; and
   a plurality of second temperature sensors configured to detect temperatures of the second heat medium flowing respectively out of the plurality of third heat exchangers,
   the controller being configured to control the pump and the compressor, and when a state in which a driving voltage of the pump is set to an upper limit voltage and an opening degree of at least one of the plurality of flow rate control valves is set to a maximum opening degree continues for a first determination time period, the controller being configured to raise an operation frequency of the compressor by a first amount of increase at a first time so as to increase an amount of heat exchange by the second heat exchanger, and
   when a difference between the temperatures detected by one of the plurality of first temperature sensors and one of the plurality of second temperature sensors corresponding to one of the plurality of third heat exchangers provided with one of the plurality of flow rate control valves set to the maximum opening degree is smaller than a target value after a lapse of a second determination time period since the first time, the controller being configured to further raise the operation frequency of the compressor by a second amount of increase.

2. The controller according to claim 1, wherein
   when an operation stop request is input, or an indoor temperature reaches a set temperature, in at least one of the plurality of third heat exchangers after the first time, the controller is configured to lower the operation frequency of the compressor or lower the driving voltage of the pump.

3. The controller according to claim 1, wherein
   the first heat medium is refrigerant,
   the second heat medium is water, and
   the controller is configured to control the operation frequency of the compressor to such an extent that an evaporation temperature of the refrigerant in the second heat exchanger does not fall below a freezing temperature of the water.

4. The controller according to claim 1, wherein
   when at least one of the plurality of third heat exchangers is insufficient in air conditioning performance, if the opening degree of the flow rate control valve corresponding to the third heat exchanger insufficient in air conditioning performance is smaller than the maximum opening degree, or if the driving voltage of the pump is lower than the upper limit voltage, the controller is configured to raise the driving voltage of the pump or increase the opening degree of the corresponding flow rate control valve, so as to increase the flow rate of the second heat medium flowing in the third heat exchanger insufficient in air conditioning performance.

5. The controller according to claim 1, wherein
   an outdoor unit comprises the compressor, the first heat exchanger, and the controller.

6. The controller according to claim 1, wherein
   a relay unit comprises the second heat exchanger, the pump, and the controller.

7. The controller according to claim 1, wherein
   a heat source apparatus comprises the compressor, the first heat exchanger, the second heat exchanger, the pump, and the controller.

8. An air conditioning system, comprising:
   the controller according to claim 1,
   wherein
   a first heat medium circuit is formed by the compressor, the first heat exchanger and the second heat exchanger; and
   a second heat medium circuit is formed by the pump, the second heat exchanger and the plurality of third heat exchangers.

* * * * *